United States Patent [19]
Helstern

[11] Patent Number: 5,820,246
[45] Date of Patent: Oct. 13, 1998

[54] DISPLAY SYSTEM HAVING ELECTROLUMINESCENT DEVICES

[75] Inventor: Robert P. Helstern, Costa Mesa, Calif.

[73] Assignee: Eaton Corporation, Celveland, Ohio

[21] Appl. No.: 598,436

[22] Filed: Feb. 8, 1996

[51] Int. Cl.$^6$ .............. F21V 13/00; G01D 11/28
[52] U.S. Cl. ............... 362/84; 362/23; 362/27; 362/29; 362/326; 362/800
[58] Field of Search .................. 362/23, 26, 27, 362/28, 29, 30, 244, 339, 317, 326, 84, 85, 800

[56] References Cited

U.S. PATENT DOCUMENTS

| | | | |
|---|---|---|---|
| 4,975,807 | 12/1990 | Ohashi | 362/73 |
| 5,039,832 | 8/1991 | Polacek et al. | 362/800 |
| 5,101,326 | 3/1992 | Roney | 362/800 |
| 5,150,257 | 9/1992 | Mohabbatizadeh et al. | 362/29 |
| 5,295,050 | 3/1994 | Helstern et al. | 362/27 |
| 5,515,253 | 5/1996 | Sjobom | 362/339 |
| 5,544,019 | 8/1996 | Tatavoosian et al. | 362/23 |

Primary Examiner—Ira S. Lazarus
Assistant Examiner—Matthew Spark
Attorney, Agent, or Firm—Tarolli, Sundheim, Covell, Tummino & Szabo

[57] ABSTRACT

An improved display system includes a plurality of light sources which are electroluminescent devices, such as light emitting diodes. The light emitting diodes have an intensity of 0.5 with a light dispersion angle of 24° or less. An optical device creates a plurality of dispersion patterns from the light emitted by each of the light emitting diodes. The dispersion patterns have a viewing angle of 50° or more. The optical device includes a plurality of linear grooves having side surfaces which cooperate to create a plurality of separate dispersion patterns from the light emitted by each light emitting diode. The dispersion patterns from the light emitted by one light emitting diode are disposed along a line which extends perpendicular to the longitudinal axes of the grooves. The longitudinal axes of the grooves may extend transverse to sides of a rectangular array of light emitting diodes to minimize overlapping of the dispersion patterns and maximize the uniformity with which light is transmitted from the optical device to an outer side of a display panel.

25 Claims, 5 Drawing Sheets

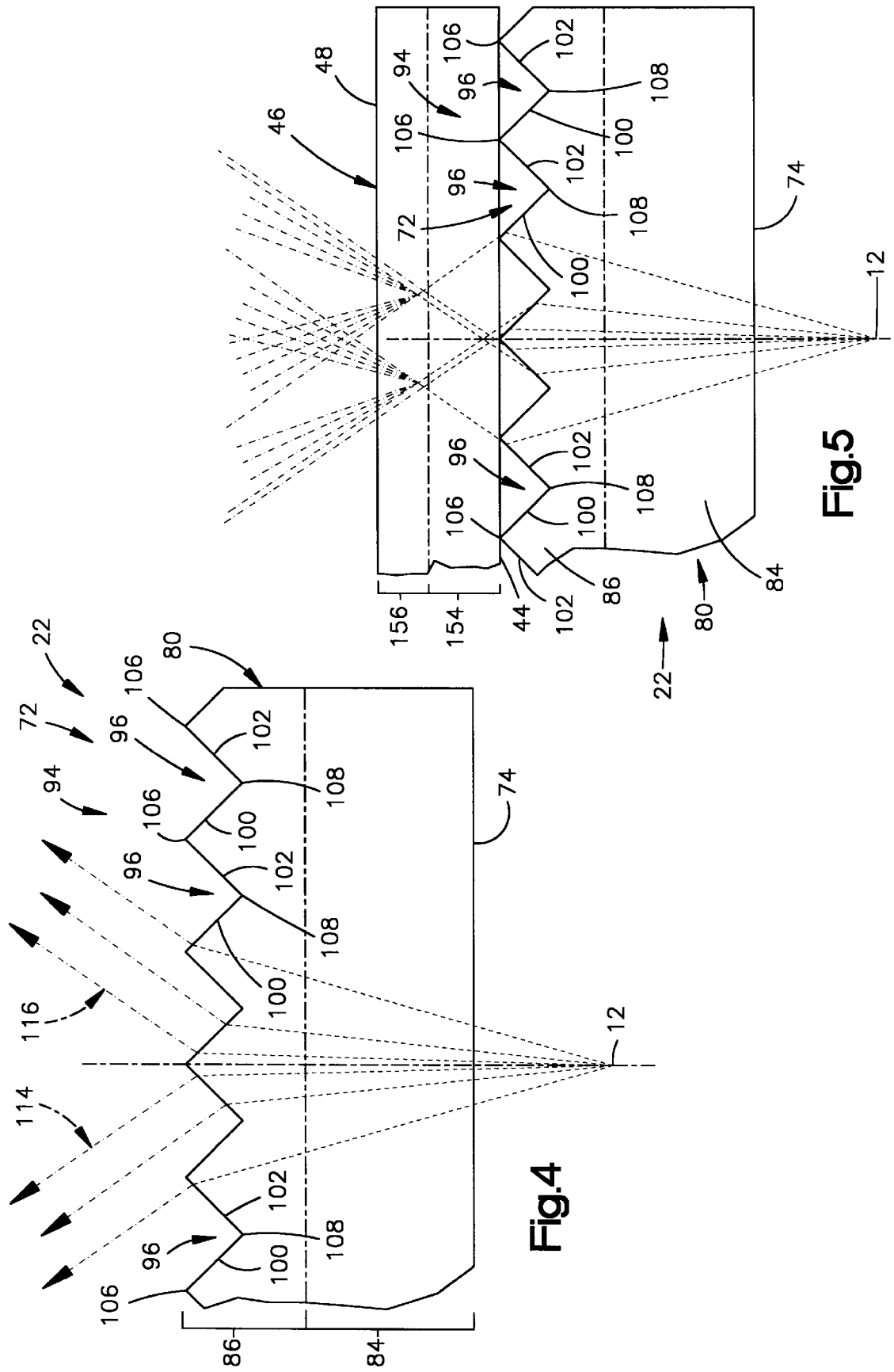

DISPLAY SYSTEM HAVING ELECTROLUMINESCENT DEVICES

BACKGROUND OF THE INVENTION

The present invention relates to a display system which utilizes electroluminescent devices as light sources.

Incandescent light sources, which emit light due solely to the temperature of the source of light, have previously been used in display systems. Incandescent light sources, such as bulbs, consume considerable energy and may have heat dissipation problems. In addition, incandescent light sources have a limited service life. One known display system utilizing incandescent light sources is disclosed in U.S. Pat. No. 5,295,050.

Luminescent light sources emit light as a function of the specific material involved and are not solely conditioned by the temperature of the source of light. Luminescence involves (1) absorption of energy; (2) excitation; and (3) emission of energy, usually in the form of radiation in the visible portion of the spectrum. The type of luminescence may be defined as a function of the excitation means. Known luminescent light sources are excited by electrical energy and may be referred to as electroluminescent devices. A light emitting diode is one example of an electroluminescent device.

Electroluminescent devices, specifically light emitting diodes, are limited in intensity and have a narrow light dispersion angle. The narrow light dispersion angle of electroluminescent light sources tends to result in an uneven distribution of light on a display panel associated with the electroluminescent light sources. This uneven distribution of light and the limited intensity of electroluminescent light sources has resulted in the use of incandescent light sources, with their associated problems, in display systems.

SUMMARY OF THE INVENTION

An improved display system includes a plurality of electroluminescent devices which emit light having an intensity of 0.5 with a light dispersion angle of 24° or less. An optical device is effective to create a plurality of dispersion patterns from the light emitted by each electroluminescent device. Each of the dispersion patterns has a viewing angle of 50° or more.

The optical device which creates the dispersion patterns may be a light separation panel having an outer side with a first plurality of longitudinally extending side surfaces and a second plurality of longitudinally extending side surfaces which slope transversely to the side surfaces of the first plurality of side surfaces and are interspersed with the first plurality of side surfaces. The first and second pluralities of side surfaces cooperate to create a plurality of dispersion patterns from the light emitted by the electroluminescent devices. The dispersion patterns created from the light emitted from any one electroluminescent device are disposed on a line which extends transverse to the side surfaces.

BRIEF DESCRIPTION OF THE DRAWINGS

The foregoing and other features of the present invention will become more apparent upon a consideration of the following description taken in connection with the accompanying drawings, wherein:

FIG. 4 is a schematic illustration of an optical device used in the display system of FIGS. 1 and 2;

FIG. 5 is a schematic illustration, generally similar to FIG. 4, illustrating the manner in which the optical device is used with a display panel in the display system of FIGS. 1 and 2;

DESCRIPTION OF ONE SPECIFIC PREFERRED EMBODIMENT OF THE INVENTION

General Description

Figure 1:
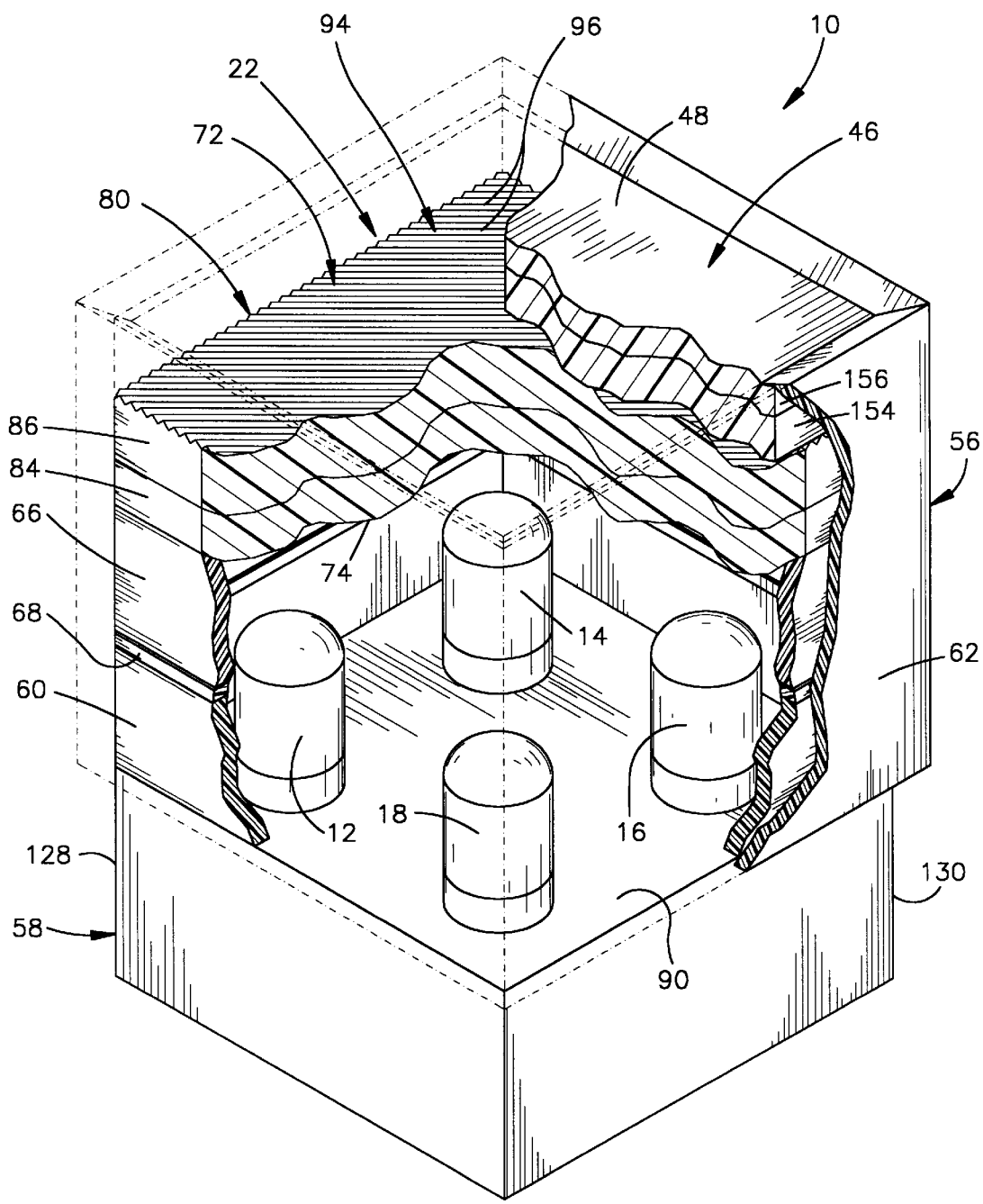
FIG. 1 is an enlarged fragmentary pictorial illustration of a display system constructed in accordance with the present invention.
Figure 2:
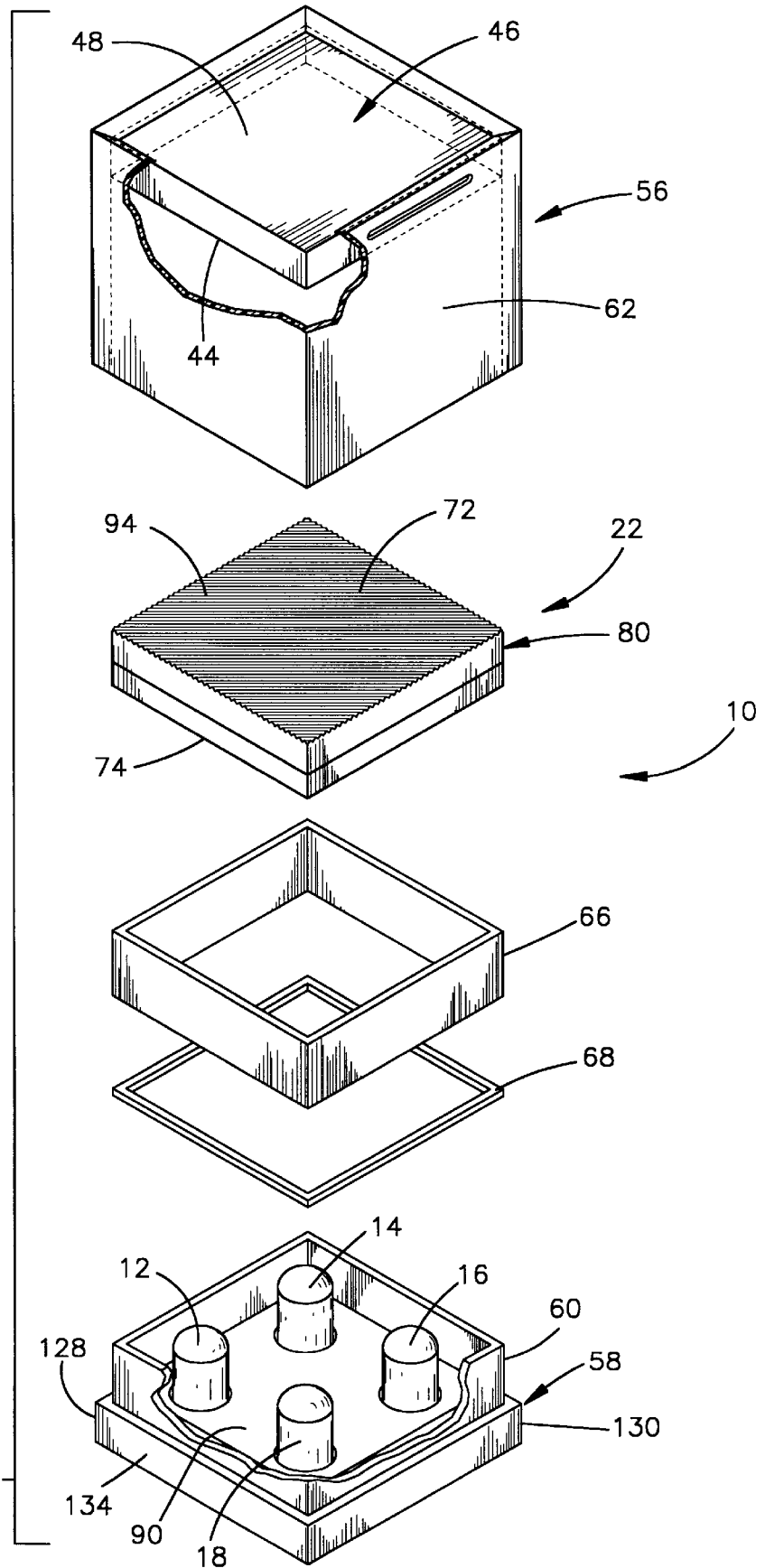
FIG. 2 is an exploded view of the display system of FIG. 1.

A display system 10 constructed in accordance with the present invention is illustrated in FIGS. 1 and 2. The display system 10 may be mounted directly on an instrument panel or may be part of a pushbutton of a switch. When the display system 10 is used in a pushbutton switch, the switch may have a construction generally similar to the construction illustrated in U.S. Pat. Nos. 5,294,900 and 5,420,386. Although it is contemplated that the display system 10 may be used in many different environments, it is believed that the display system 10 may be particularly advantageous when used in association with controls for a vehicle, such as an aircraft.

The display system 10 includes electroluminescent light sources 12, 14, 16 and 18. In the illustrated embodiment of the invention, the electroluminescent light sources 12–18 are light emitting diodes (LED) having a known construction. The light emitting diodes forming the electroluminescent light sources 12–18 have an intensity of 0.5 with a light dispersion angle of 24° or less.

Figure 3:
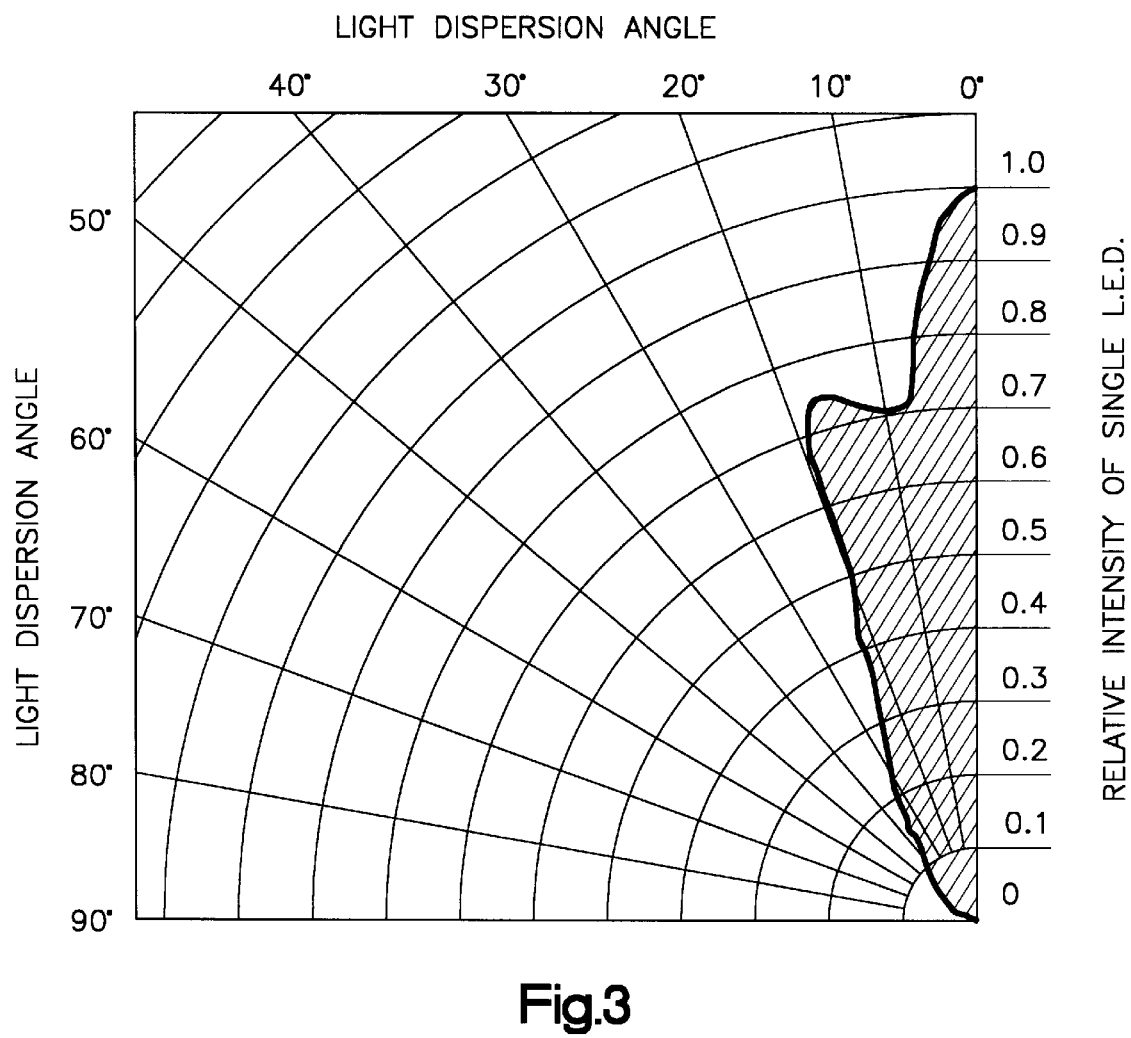
FIG. 3 is a graph illustrating the manner in which the dispersion angle of an electroluminescent light source varies with intensity.

The light emitting diodes 12–18 in the specific embodiment of the invention illustrated in FIGS. 1 and 2 have a light dispersion angle which varies with intensity in the manner illustrated by the graph in FIG. 3. These particular light emitting diodes have an intensity of 0.5 with a light dispersion angle of approximately 20°. It should be understood that the graph of FIG. 3 is illustrative of the manner in which the light dispersion angle and intensity vary for one particular light emitting diode. It is believed that most commercially available light emitting diodes and similar electroluminescent light sources have an intensity of 0.5 with a light dispersion angle of 24° or less.

In accordance with a feature of the present invention, the display system 10 (FIGS. 1 and 2) contains an optical device 22 which creates a plurality of dispersion patterns from the light emitted by each light emitting diode. Thus, the optical device 22 separates the light from a light source, in the manner illustrated schematically in FIG. 4, to form two circular dispersion patterns for each light source. Each circular dispersion pattern has a viewing angle (light dispersion angle) of 50° or more.

The optical device 22 creates dispersion patterns 26 and 28 (FIG. 6) from the light emitted by the light emitting diode 12. The optical device 22 creates dispersion patterns 30 and 32 from the light emitted by the light emitting diode 14. The optical device 22 creates dispersion patterns 34 and 36 from the light emitted by the light emitting diode 16. Finally, the optical device 22 creates dispersion patterns 38 and 40 from the light emitted by the light emitting diode 18. Although the dispersion patterns 26–40 are circular, they could have a different configuration if desired.

The dispersion patterns 26–40 are projected from the optical device 22 onto a flat lower or inner side 44 of a display panel 46 (FIGS. 2 and 5). The light is transmitted through the display panel 46 to an upper or outer side 48 of the display panel. The outer side 48 of the display panel 46 is visible to an observer. Each of the dispersion patterns 26–40 has a viewing angle of 50° or more at the inner side 44 of the display panel 46.

Figure 6:
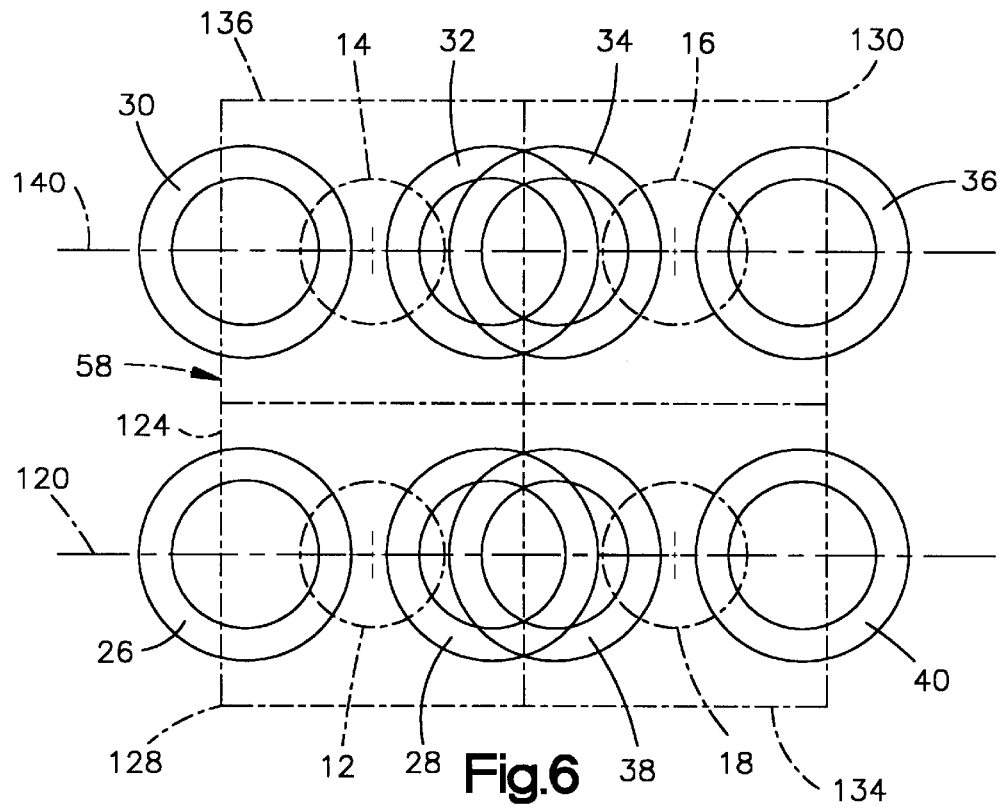
FIG. 6 is a schematic illustration depicting the relationship of dispersion patterns created from light emitted by electroluminescent devices in the display system of FIGS. 1 and 2 with the optical device in one orientation relative to the electroluminescent devices.

The area enclosed by each of the circular dispersion patterns 26–40 is brightly illuminated. However, the area outside of the dispersion patterns 26–40 is relatively dimly illuminated. The illumination is particularly intense where the dispersion patterns 28 and 38 and the dispersion patterns 32 and 34 overlap (FIG. 6).

The resulting unevenness in the illumination of the outer side 48 of the display panel 46 may be objectionable. In order to obtain more uniform illumination of the outer side 48 of the display panel 46, the optical device 22 is rotated through 45° relative to the light emitting diodes 12–18. This results in the dispersion patterns 26–40 being shifted from the orientation shown in FIG. 6 to the orientation shown in FIG. 7.

Figure 7:
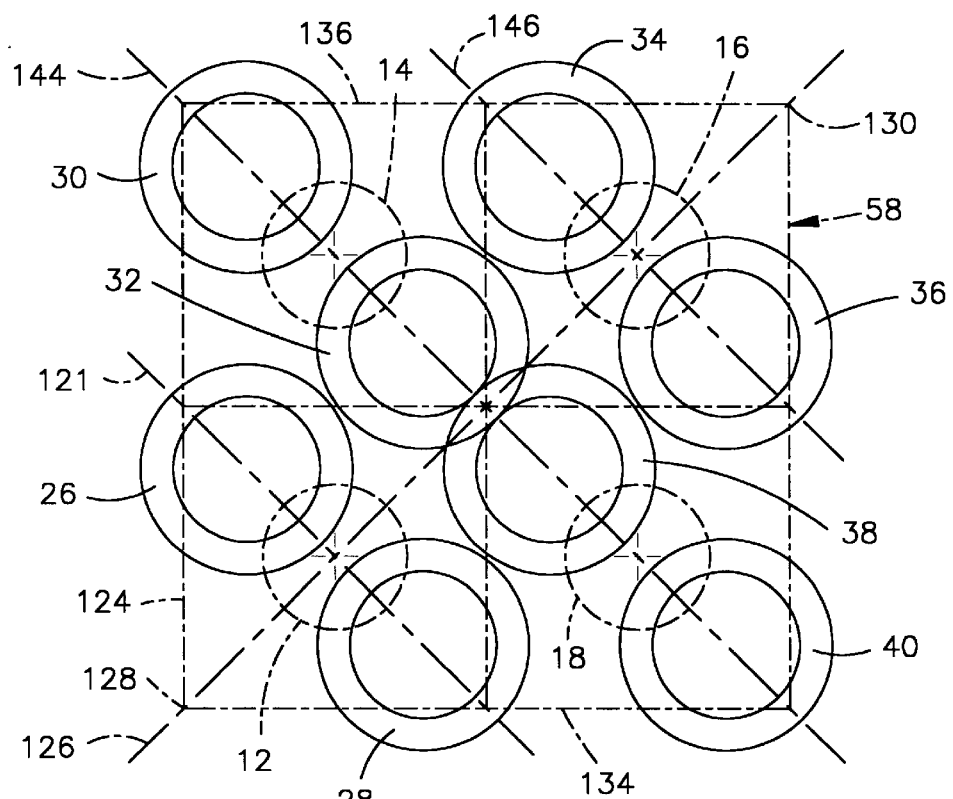
FIG. 7 is a schematic illustration depicting the relationship of dispersion patterns created from the light emitted electroluminescent devices in the display system of FIGS. 1 and 2 with the optical device in an orientation offset by 45° from the orientation of FIG. 6.

The only overlap which occurs between the dispersion patterns in FIG. 7 is the relatively small amount of overlap between the dispersion patterns 32 and 38. By minimizing the overlap of the dispersion patterns 26–40, the uniformity of illumination of the outer side 48 of the display panel 46 is improved.

In order to further improve the uniformity of illumination of the outer side 48 (FIGS. 1 and 2) of the display panel 46, a light scattering media is advantageously provided in the display panel 46. In addition, a light scattering media is advantageously provided in the optical device 22. The presence of the light scattering media in the display panel 46 and optical device 22 results in the outer side 48 of the display panel having a substantially uniform illumination. The outer side 48 of the display panel 46 is roughened by abrasion to further improve the uniformity of the illumination.

Indicia may be mounted on or within the display panel 46. Thus, indicia may be mounted on either the inner side 44 or the outer side 48 of the display panel 46. If desired, the indicia could be placed within the display panel 46 along a plane which is disposed between and extends parallel to the inner side 44 and outer side 48 of the display panel.

Housing

The light emitting diodes 12–18, optical device 22 and display panel 46 are enclosed in an opaque rectangular housing 56 (FIG. 1). The housing 56 includes a rigid opaque rectangular base 58 (FIGS. 1 and 2) on which the rectangular array of light emitting diodes 12–18 is disposed. The housing 56 may be fixedly secured to a stationary base, such as the control panel of an aircraft, or may form part of a movable actuator for a switch. Of course, the housing 56 could be mounted in a different manner if desired.

An opaque rectangular inner side wall 60, formed of a suitable polymeric material, is molded as one piece with the base 58 and extends upward (as viewed in FIGS. 1 and 2) from the base. The inner side wall 60 encloses the rectangular array of light emitting diodes 12–18. An opaque metal outer side wall 62 telescopes around the inner side wall 60. The display panel 46 is mounted on the upper (as viewed in FIG. 2) end portion of the outer side wall 62. The lower end portion of the outer side wall 62 is fixedly connected with the base 58.

The optical device 22 is supported in the housing 56 on an opaque rectangular spacer member 66 formed of a suitable polymeric material. A rectangular light sealing gasket 68 is provided between the spacer member 66 and the inner side wall 60. The optical device 22 is supported on the spacer 66 and is enclosed by the outer side wall 62 of the housing 56. The optical device 22 has a grooved upper or outer side 72 which engages the inner side 44 of the display panel 46. In addition, the optical device 22 has a flat lower or inner side 74 which engages the spacer 66 and extends parallel to the inner side 44 of the display panel 46.

The base 58, inner side wall 60, outer side wall 62, spacer 66, and gasket 68 are all formed of opaque materials. This results in the light from the light emitting diodes 12–18 being transmitted upward toward the optical device 22 and display panel 46. In addition, ambient light is blocked from entering the space between the base 58 and the optical device 22.

Optical Device

The light emitting diodes 12–18 have a light dispersion angle of 24° or less with an intensity of 0.5 (FIG. 3). The relatively small light dispersion angle of 24° or less results in the light from each of the light emitting diodes 12–18 being concentrated in a circle on the inner side 74 of the optical device 22. If the light from the light emitting diodes 12–18 was transmitted directly to the display panel 46 without passing through the optical device 22, an individual viewing display panel 46 would see four bright circular areas on the outer side 48 of the display panel 46. The space between the small circular areas of bright light would be dimly illuminated.

Thus, when the optical device 22 is eliminated, there is a large variation in the intensity of illumination across the outer side 48 of the display panel 46. The large variation in the intensity of the light at various portions of the outer side 48 of the display system 10 would result in a very low illumination standard for legibility and readability of any indicia which may be provided in association with the display panel 46. Even if indicia is not provided in association with the display panel 46, the very large variation in the intensity of illumination across the outer side 48 of the display system 10 would be objectionable.

In the illustrated embodiment of the invention, the optical device 22 is a light separation panel 80. The light separation panel 80 separates and bends light rays from the light emitting diodes 12–18 to form the circular dispersion patterns 26–40 (FIGS. 6 and 7). The light dispersion patterns 26–40 are projected onto the inner side 44 of the display panel 46. Each of the circular light dispersion patterns 26–40 has a viewing angle of 50° or more. In the specific embodiment of the invention illustrated in FIGS. 1–7, the light dispersion angle for the dispersion patterns 26–40 was approximately 70°.

The light separation panel 80 creates a plurality of circular dispersion patterns from the light emitted from each of the light emitting diodes 12–18. Thus, for one of the light emitting diodes, for example, the light emitting diode 12, the light separation panel 80 is effective to separate the light rays from the light emitting diode into two separate circular dispersion patterns 26 and 28. The dispersion patterns 26 and 28 are projected to spaced apart locations on the inner side 44 of the display panel 46.

Each of the dispersion patterns 26 and 28 has a light dispersion angle of more than twice the light dispersion angle of the light emitting diode 12 from which the light rays originated. Thus, in one embodiment of the invention, the light emitting diode 12 had an intensity of 0.5 with a dispersion angle of approximately 20°. The light separation panel 80 was effective to create two dispersion patterns 26 and 28 each of which had a light dispersion angle of approximately 70°.

The light separation panel 80 (FIG. 4) is formed of an optically clear material, such as glass, polymethylmethacrylate, or polycarbonate resin. The light separation panel 80 has an inner or lower section 84 (FIGS. 4 and 5) which is optically clear and an outer or upper section 86 which is formed of an optically clear material and contains a light scattering media, specifically, particles of polystyrene. Of course, the light scattering media could be formed of particles of a different material if desired.

The inner and outer sections 84 and 86 of the light separation panel 80 may be formed of the same optically clear material or may be formed of different optically clear materials. However, the material of which the inner and outer sections 84 and 86 are formed has an index of refraction which is at least 1.3. The inner and outer sections 84 and 86 can be layered by bonding, homogeneously blended by casting or molding, or stacked physically together. Separate inner and outer sections 84 and 86 may be interconnected with optically clear adhesive.

The inner side 74 of the light separation panel 80 is a flat planar surface. The inner side 74 of the light separation panel 80 extends perpendicular to the vertical (as viewed in FIG. 1) central axes of the light emitting diodes 12–18. The flat inner side 74 of the light separation panel 80 is parallel to an upper side 90 of the base 58 and to the inner side 44 of the display panel 46 (FIG. 2).

A series 94 (FIGS. 1 and 4) of parallel linear grooves 96 extend across the outer or upper side 72 of the light separation panel 80. Each of the grooves 96 is defined by a pair of flat linear side surfaces 100 and 102 (FIG. 4) and has a V-shaped cross sectional configuration. The flat linear side surfaces 100 and 102 intersect at parallel linear ridges or peaks 106 and at parallel linear valleys or troughs 108. Although it is preferred to form the grooves 96 with a V-shaped cross sectional configuration, the grooves could have a different cross sectional configuration if desired. For example, the peaks and troughs 106 and 108 could be arcuate and/or the side surfaces 100 and 102 could have a configuration other than the illustrated flat configuration.

The included angle between a pair of flat side surfaces 100 and 102 at a valley 108 is approximately 80°. The included angle between a pair of side surfaces 100 and 102 at a peak or ridge 106 is also approximately 80°. The parallel linear peaks or ridges 106 and valleys 108 extend across the upper side 72 of the light separation panel 80. Of course, the peaks 106 and valleys 108 could have different angles if desired.

In one specific embodiment of the light separation panel 80, the V-shaped linear grooves 96 had a depth of approximately 0.009 inches as measured from a peak 106 to a valley 108 in a direction perpendicular to the inner side 74 of the light separation panel. The horizontal distance between a vertical (as viewed in FIG. 4) plane through the apex of a ridge or peak 106 and a vertical plane through the apex of an adjacent valley 108 is approximately 0.010 inches. The distance from one peak 106 to the next adjacent peak as measured along a horizontal (as viewed in FIG. 4) plane through the apexes of the peaks, is approximately 0.020 inches. Of course, the distance between the apexes of the valleys 108 is equal to the distance between the apexes of the peaks 106. It should be understood that the specific dimensions and angles for the V-shaped grooves 96 have been set forth herein for purposes of clarity of description. It is contemplated that the outer or upper side 72 of the light separation panel 80 may be constructed with grooves having different angles, configurations, and/or dimensions if desired.

The apexes of the linear peaks or ridges 106 are spaced a distance of 0.160 to 0.240 inches from upper end portions of the light emitting diodes 12–18 (FIGS. 1, 4 and 5). The upper end portions of the light emitting diodes 12–18 are disposed in a horizontal plane (as viewed in FIG. 1) which extends parallel to the lower side 74 of the light separation panel 80 and parallel to the apexes of the peaks or ridges 106 and to the apexes of the valleys or troughs 108. It should be understood that the foregoing specific distances associated with the light separation panel 80 have been set forth herein for purposes of clarity of description. It is contemplated that these dimensions and/or distances will vary depending upon the specific construction of the display system 10.

The light rays emanating from each one of the light emitting diodes, for example, the light emitting diode 12 (FIG. 4), are separated into two groups of light rays, indicated schematically at 114 and 116. The light rays in the group 114 form the dispersion pattern 26 (FIG. 6) while the light rays in the group 116 form the dispersion pattern 28. The circular dispersion patterns 26 and 28 formed from light emitted by the light emitting diode 12 have centers which are disposed along an axis indicated at 120 in FIG. 6. The center of the light emitting diode 12 is also disposed on the axis 120. The axis 120 extends perpendicular to the longitudinal central axes of the grooves 96 in the light separation panel 80.

The centers of the two circular dispersion patterns from any one of the light emitting diodes 12–18 lie on an axis which extends through the center of the light emitting diode. This axis extends perpendicular to longitudinal central axes of the grooves 96 in the light separation panel 80.

In FIG. 6, the linear grooves 96 in the light separation panel 80 (FIGS. 4 and 5) are oriented to run parallel to a side of the rectangular array 12–18 of light emitting diodes. The axis 120 extending through the center of the light emitting diode 12 and the associated dispersion patterns 26 and 28 extends perpendicular to a side of the rectangular array of light emitting diodes. Thus, in FIG. 6, the longitudinal axes of the grooves 96 (FIGS. 4 and 5) extend parallel to a side 124 of the base 58 while the axis 120 extends perpendicular to the side 124 of the base.

If the orientation of the linear grooves 96 is changed relative to the base 58 and the rectangular array of light emitting diodes 12–18, the orientation of the dispersion patterns 26–40 changes relative to the base and the array of light emitting diodes. However, the centers of the circular dispersion patterns from the light emitting diodes remain on axes which extend through the centers of the light emitting diodes. These axes will extend perpendicular to the longitudinal central axes of the linear grooves 96 in the light separation panel 80.

For example, if the orientation of the light separation panel 80 relative to the light emitting diodes 12–18 is changed by 45° from the orientation of FIG. 6 to the orientation of FIGS. 1 and 7, the axis 120 rotates through 45° about the center of the light emitting diode 12 from the orientation shown in FIG. 6 to the orientation shown in FIG. 7 for the axis 121. When the light separation panel 80 is in the orientation of FIG. 7, the longitudinal central axes of the linear grooves 96 (FIGS. 4 and 5) extend parallel to an axis 126 (FIG. 7) extending through opposite corners 128 and 130 of the base 58. The axis 121 through the centers of the dispersion patterns 26 and 28 and the light emitting diode 12 extend perpendicular to the axis 126 and to the longitudinal central axes of the grooves 96 in the light separation panel 80.

When the longitudinal central axes of the grooves 96 in the light separation panel 80 extend perpendicular to opposite sides 134 and 136 (FIG. 6) of the base 58, the dispersion patterns 26–40 have centers which are disposed on either the axis 120 or an axis 140 which extends parallel to the sides 134 and 136 of the base 58. Thus, the centers of the light emitting diodes 12 and 18 and circular dispersion patterns 26, 28, 38 and 40 are disposed on the axis 120 (FIG. 6). The centers of the light emitting diodes 14 and 16 and the circular dispersion patterns 30, 32, 34 and 36 are disposed on the axis 140. The parallel axes 120 and 140 extend parallel to the opposite sides 134 and 136 of the rectangular base 58 and extend perpendicular to the longitudinal central axes of the grooves 96 in the light separation panel.

When the light separation panel 80 is oriented with the longitudinal central axes of the grooves 96 extending parallel to the axis 126 (FIG. 7), the circular light dispersion patterns 26–40 are oriented relative to the diodes 12–18 so that their centers are on axes which extend perpendicular to the axis 126. Thus, the axis 121 through the centers of the circular dispersion patterns 26 and 28 and the light emitting diode 12 extends perpendicular to the axis 126. The axis 121 (FIG. 7) also extends perpendicular to the longitudinal central axes of the linear grooves 96 (FIG. 5) in the light separation panel 80.

The circular dispersion patterns 30, 32, 38 and 40 (FIG. 7) and light emitting diodes 14 and 18 are disposed with their centers on an axis 144. The axis 144 extends parallel to the axis 120 and perpendicular to the axis 126. Similarly, the centers of the dispersion patterns 34 and 36 and light emitting diode 16 are disposed on an axis 146. The axis 146 extends parallel to the axis 144 and perpendicular to the axis 126.

It is believed that it will be preferred to orient the light separation panel 80 in the orientation corresponding to the orientation shown in FIGS. 1 and 7. When this orientation is selected, the parallel axes 121, 144 and 146 extending through the centers of the light emitting diodes 12–18 and circular dispersion patterns 26–40 are skewed at an acute angle of 45° relative to the sides of the base 58 and to linear imaginary lines enclosing the rectangular array of light emitting diodes 12–18. With this orientation of the light separation panel 80, there is minimal overlap of the light dispersion patterns 26–40 and substantial uniformity in the illumination of the outer side 48 of the display panel 46. When the light dispersion panel 80 is oriented with the longitudinal central axes of the grooves 96 extending parallel to peripheral edges of the rectangular array of light emitting diodes 12–18, as shown in FIG. 6, the dispersion patterns are oriented so that the overlap between the dispersion patterns is substantial and the area of the display panel 46 which is not illuminated by the dispersion patterns is relatively large.

It should be understood that the particular orientation which is selected for the longitudinal central axes of the linear grooves 96 in the light separation panel 80 relative to an array of light emitting diodes 12–18 will depend upon the configuration of the array of light emitting diodes and the indicia to be illuminated by the light emitting diodes. It is believed that it may be preferred to position the light separation panel 80 with the longitudinal central axes of the V-shaped grooves 96 skewed at an angle of 45° to the sides of the rectangular base 58 and rectangular array of light emitting diodes 12–18, as shown in FIG. 1. It is contemplated that when the base 58 of a display system 10 has a different configuration and/or the light emitting diodes are arranged in an array having a different configuration, it may be preferred to position the light separation panel 80 with the grooves 96 in a different orientation relative to the base and light emitting diodes. It is believed that for any given configuration of the array of light emitting diodes, it will be preferred to orient the grooves 96 in the light separation panel 80 to maximize the uniformity of the illumination of the display panel 46.

In the illustrated embodiment of the invention, the optical device 22 is the light separation panel 80. However, it is contemplated that different optical devices could be utilized other than the light separation panel 80. For example, an arrangement of prisms could be utilized if desired.

In the illustrated embodiment of the light separation panel 80, the parallel linear grooves 96 are continuous and extend across the outer side 72 of the light separation panel. However, it is contemplated that the grooves could be discontinuous. If desired, some of the grooves could extend in one direction and other grooves could extend in another direction. For example, the grooves could be arranged so that the outer side 72 of the light separation panel 80 has the same construction as the outer side of the outer panel disclosed in U.S. patent application Ser. No. 08/393,161 filed Feb. 21, 1995 by Vanacan Tatavoosian, Robert Helstern, and John Lombardo and entitled "Display System".

Display Panel

The light rays are projected from the light separation panel 80 onto the flat inner or lower side 44 of the display panel 46 (FIG. 5). When the longitudinal central axes of the V-shaped grooves 96 in the light separation panel 80 extend parallel to the side 124 of the base 58 (FIG. 6) and perpendicular to the sides 134 and 136, the dispersion patterns 26–40 appear on the inner side 44 of the display panel 46 in the manner shown schematically in FIG. 6. Similarly, when the light separation panel 80 is oriented with the longitudinal central axes of the V-shaped grooves 96 skewed at an acute angle to the sides of the base 58 and parallel to the axis 126 (FIG. 7), the dispersion patterns 26–40 appear on the inner side 44 of the display panel 46 in the manner indicated schematically in FIG. 7.

Although the arrangement of dispersion patterns 26–40 illustrated in FIG. 7 results in a relatively uniform illumination of the inner side 44 of the display panel 46, there will be areas which will be more brightly illuminated than other areas. In order to provide the outer or upper side 48 of the display panel with as uniform illumination as possible, a slight scattering media is provided in the display panel 46. The light scattering media disperses the light rays in each of the dispersion patterns 26–40 sufficiently to result in an relatively uniform illumination of the upper side 48 of the display panel.

The display panel 46 has an inner or lower section 154 and an outer or upper section 156 (FIG. 5). The inner and outer sections 154 and 156 are formed of optically clear materials having an index of refraction of 1.3 or more. Thus, the inner and outer sections 154 and 156 of the display panel 46 may be formed of glass, polymethylmethacrylate, or polycarbonate resins. The inner and outer sections 154 and 156 can be layered by bonding, homogeneously blending by casting or molding, or by stacking physically together. If desired, an optically clear adhesive could be utilized to interconnect separate sections.

The inner or lower section 154 of the display panel is optically clear. The outer or upper section 156 of the display panel 46 is also formed of an optically clear material. However, a light scattering media is embedded in the outer section 156 of the display panel 46. The light scattering media may be particles of polystyrene. Of course, the light scattering media could be formed of different particles if desired.

The flat smooth inner side 44 of the display panel 46 engages the peaks or ridges 106 in the outer side 72 of the light separation panel 80. The outer side 48 of the display panel 46 extends parallel to the inner side and is roughened to further disperse the light from the light emitting diodes 12–18. The inner side 44 of the display panel 46 extends parallel to the inner side 74 of the light separation panel 80.

Conclusion

In view of the foregoing description, it is apparent that the present invention provides a new and improved display system 10. The display system 10 includes a plurality of electroluminescent devices 12–18 which emit light having an intensity of 0.5 with a light dispersion angle of 24° or less. An optical device 22 is effective to create a plurality of dispersion patterns 26–40 from the light emitted by each electroluminescent device 12–18. Each of the dispersion patterns 26–40 has a viewing angle of 50° or more.

The optical device 22 which creates the dispersion patterns 26–40 may be a light separation panel 80 having an outer side with a first plurality of longitudinally extending side surfaces 100 and a second plurality of longitudinally extending side surfaces 102 which slope transversely to the side surfaces 100 of the first plurality of side surfaces and are interspersed with the first plurality of side surfaces. The first and second pluralities of side surfaces 100 and 102 cooperate to create a plurality of dispersion patterns 26–40 from the light emitted by the electroluminescent devices 12–18. The dispersion patterns created from the light emitted from any one electroluminescent device 12, 14, 16 or 18 are disposed on a line 121, 140, 144 or 146 which extends transverse to the side surfaces 100 and 102.

Having described the invention, the following is claimed:

1. A display system comprising a base, a plurality of electroluminescent devices mounted on said base, each of said electroluminescent devices emitting light having an intensity of 0.5 with a light dispersion angle of 24° or less, a display panel connected with said base and having an outer side which is visible to an observer and an inner side which faces toward said electroluminescent devices, and optical means disposed between the inner side of said display panel and said plurality of electroluminescent devices for creating a plurality of dispersion patterns which are projected onto the inner side of said display panel, said optical means being effective to create a plurality of dispersion patterns from the light emitted by each electroluminescent device with each of the dispersion patterns having a viewing angle of 50° or more at the inner side of said display panel.

2. A display system as set forth in claim 1 wherein each of said electroluminescent devices is a light emitting diode.

3. A display system as set forth in claim 1 wherein said optical means includes a light separation panel having an inner side which faces toward said plurality of electroluminescent devices and an outer side which faces toward said inner side of said display panel and is formed by a series of parallel linear V-shaped grooves, said V-shaped grooves having side surfaces which intersect to form a series of parallel ridges to separate light rays transmitted from each one of said electroluminescent devices into a plurality of dispersion patterns which are projected onto the inner side of said display panel.

4. An apparatus as set forth in claim 3 wherein said plurality of electroluminescent devices are disposed in a rectangular array disposed within a rectangle formed by imaginary lines, said linear V-shaped grooves having longitudinal central axes which are skewed at acute angles to the imaginary lines.

5. An apparatus as set forth in claim 3 wherein each of the dispersion patterns formed from the light emitted by each electroluminescent device has an arcuate configuration, the centers of curvature of the dispersion patterns formed from the light emitted by any one electroluminescent device being disposed along a line which extends perpendicular to longitudinal central axes of the linear V-shaped grooves in the outer side of said light separation panel.

6. An apparatus as set forth in claim 3 wherein the inner side of said light separation panel extends parallel to longitudinal central axes of the linear V-shaped grooves formed in the inner side of said light separation panel.

7. An apparatus as set forth in claim 3 wherein the inner side of said display panel is disposed in engagement with the parallel ridges formed in the outer side of said light separation panel and extends parallel to the inner side of said light separation panel.

8. A display system comprising a base, a plurality of electroluminescent devices mounted on said base, a display panel connected with said base and having an outer side which is visible to an observer and an inner side which faces toward said electroluminescent devices, and a light separation panel having an inner side which faces toward said plurality of electroluminescent devices and an outer side which faces toward said inner side of said display panel, said outer side of said light separation panel including a first plurality of longitudinally extending side surfaces which slope at an acute angle to said inner side surface of said light separation panel and a second plurality of longitudinally extending side surfaces which slope transversely to side surfaces of said first plurality of longitudinally extending side surfaces and which slope at an acute angle to said inner side surface of said light separation panel, said side surfaces of said second plurality of longitudinally extending side surfaces being interspersed with said side surfaces of said first plurality of longitudinally extending side surfaces to at least partially define a plurality of grooves in the outer side of said light separation panel, said first and second pluralities of longitudinally extending side surfaces cooperating to create a plurality of separate dispersion patterns from the light emitted by each electroluminescent device, each of the dispersion patterns being projected onto the inner side of said display panel with a first dispersion pattern created from light emitted from one of said electroluminescent devices spaced from a second dispersion pattern created from light emitted from said one of said electroluminescent devices.

9. A display system as set forth in claim 8 wherein a dispersion pattern created from light emitted from a first one of said electroluminescent devices overlaps at least a portion of a dispersion pattern created from light emitted from a second one of said electroluminescent devices.

10. A display system as set forth in claim 8 wherein the plurality of electroluminescent devices are arranged in an array having linear edge portions, said side surfaces in said first and second pluralities of longitudinally extending side surfaces having longitudinal axes which are skewed at acute angles to the linear edge portions of the array of electroluminescent devices.

11. A display system as set forth in claim 8 wherein said light separation panel includes an inner section on which the inner side of said light separation panel is disposed and an outer section on which the outer side of said light separation panel is disposed, said inner section of said light separation panel being optically clear and said outer section of said light separation panel contains particles of a scattering media to disperse light transmitted through said outer section of said light separation panel.

12. A display system as set forth in claim 8 wherein said light separation panel is formed of a material having an index of refraction of 1.3 or more.

13. A display system as set forth in claim 8 wherein each of said electroluminescent devices emits light having an intensity of 0.5 with a light dispersion angle of 24° or less, each of the dispersion patterns having a viewing angle of 50° or more.

14. A display system comprising a base, a plurality of electroluminescent devices mounted on said base, a display panel connected with said base and having an outer side which is visible to an observer and an inner side which faces toward said electroluminescent devices, and a light separation panel having an inner side which faces toward said plurality of electroluminescent devices and an outer side which faces toward said inner side of said display panel, said outer side of said light separation panel including a first plurality of longitudinally extending linear side surfaces which slope at an acute angle to said inner side surface of said light separation panel and a second plurality of longitudinally extending linear side surfaces which slope transversely to side surfaces of said first plurality of longitudinally extending linear side surfaces and which slope at an acute angle to said inner side surface of said light separation panel, said side surfaces of said second plurality of longitudinally extending linear side surfaces being interspersed with said side surfaces of said first plurality of longitudinally extending linear side surfaces to at least partially define a plurality of parallel linear grooves in the outer side of said light separation panel, said first and second pluralities of longitudinally extending linear side surfaces cooperating to create a plurality of separate dispersion patterns from the light emitted by each electroluminescent device, the dispersion patterns formed from the light emitted by any one electroluminescent device being disposed along a line which extends transverse to longitudinal central axes of the linear grooves.

15. A display system as set forth in claim 14 wherein each of said electroluminescent devices emits light having an intensity of 0.5 with a light dispersion angle of 24° or less, each of the dispersion patterns having a viewing angle of 50° or more.

16. A display system as set forth in claim 14 wherein each of said electroluminescent devices is a light emitting diode.

17. A display system as set forth in claim 14 wherein the inner side of said display panel is disposed in engagement with parallel longitudinally extending ridges disposed in the outer side of said light separation panel between said parallel linear grooves.

18. A display system as set forth in claim 14 wherein each of the linear grooves in the outer side of said light separation panel has a V-shaped configuration as viewed in a plane extending perpendicular to longitudinal central axes of the linear grooves.

19. A display system as set forth in claim 14 wherein a dispersion pattern created from light emitted from a first one of said electroluminescent devices overlaps at least a portion of a dispersion pattern created from light emitted from a second one of said electroluminescent devices.

20. A display system as set forth in claim 14 wherein the plurality of electroluminescent devices are arranged in an array having linear edge portions, said side surfaces in said first and second pluralities of longitudinally extending linear side surfaces having longitudinal axes which are skewed at acute angles to edge portions of the array of electroluminescent devices.

21. A display system as set forth in claim 14 wherein said light separation panel includes an inner section on which the inner side of said light separation panel is disposed and an outer section on which the outer side of said light separation panel is disposed, said inner section of said light separation panel being optically clear and said outer section of said light separation panel contains particles of a scattering media to disperse light transmitted through said outer section of said light separation panel.

22. A display system comprising a base, a plurality of electroluminescent devices mounted on said base, a display panel connected with said base and having an outer side which is visible to an observer and an inner side which faces toward said electroluminescent devices, and means for creating a plurality of spaced apart circular dispersion patterns from the light emitted from each electroluminescent device, said means for creating a plurality of spaced apart dispersion patterns includes a light separation panel having a flat inner side which faces toward said plurality of electroluminescent devices and an outer side which faces toward said inner side of said display panel, said flat inner side of said light separation panel extending parallel to said inner side of said display panel, said outer side of said light separation panel including a first plurality of longitudinally extending linear side surfaces which slope at an acute angle to said inner side of said light separation panel and a second plurality of longitudinally extending linear side surfaces which slope transversely to side surfaces of said first plurality of longitudinally extending linear side surfaces and which slope at an acute angle to said inner side of said light separation panel, said side surfaces of said second plurality of longitudinally extending linear side surfaces being interspersed with said side surfaces of said first plurality of longitudinally extending linear side surfaces to at least partially define a plurality of parallel linear grooves in said outer side of said light separation panel, said flat inner side surface of said light separation panel being disposed in a plane extending parallel to a plane containing longitudinal central axes of said linear grooves in said outer side of said light separation panel, the circular dispersion patterns formed from the light emitted by any one electroluminescent device having centers of curvature disposed along a line which extends transverse to the longitudinal central axes of said linear grooves in said outer side of said light separation panel.

23. A display system as set forth in claim 22 wherein the inner side of said display panel is disposed in engagement said outer side of said light separation panel between said parallel linear grooves.

24. A display system as set forth in claim 22 wherein said light separation panel includes an inner section on which the inner side of said light separation panel is disposed and an outer section on which the outer side of said light separation panel is disposed, said inner section of said light separation panel being optically clear and said outer section of said light separation panel contains particles of a scattering media to disperse light transmitted through said outer section of said light separation panel.

25. A display system comprising a base, a plurality of electroluminescent devices mounted on said base, each of said electroluminescent devices emitting light having an intensity of 0.5 with a light dispersion angle of 24° or less, a display panel connected with said base and having an outer side which is visible to an observer and an inner side which faces toward said electroluminescent devices, and optical means disposed between the inner side of said display panel and said plurality of electroluminescent devices for creating a plurality of dispersion patterns which are projected onto the inner side of said display panel, said optical means being effective to create a plurality of dispersion patterns from the light emitted by each electroluminescent device with each of the dispersion patterns having a viewing angle of 50° or more at the inner side of said display panel, said optical means includes a light separation panel having a flat inner side which faces toward said plurality of electroluminescent devices and an outer side which faces toward said inner side of said display panel and is formed by a series of parallel linear V-shaped grooves, said inner side of said light separation panel extends parallel to said inner side of said display panel and to longitudinal central axes of said V-shaped grooves, said V-shaped grooves having side surfaces which intersect to form a series of parallel ridges to separate light rays transmitted from each one of said electroluminescent devices into a plurality of dispersion patterns which are projected onto the inner side of said display panel, each of the dispersion patterns formed from the light emitted by each electroluminescent device has an arcuate configuration, the centers of curvature of the dispersion patterns formed from the light emitted by any one electroluminescent device being disposed along a line which extends perpendicular to longitudinal central axes of the linear V-shaped grooves in the outer side of said light separation panel.

\* \* \* \* \*